Figure 1:
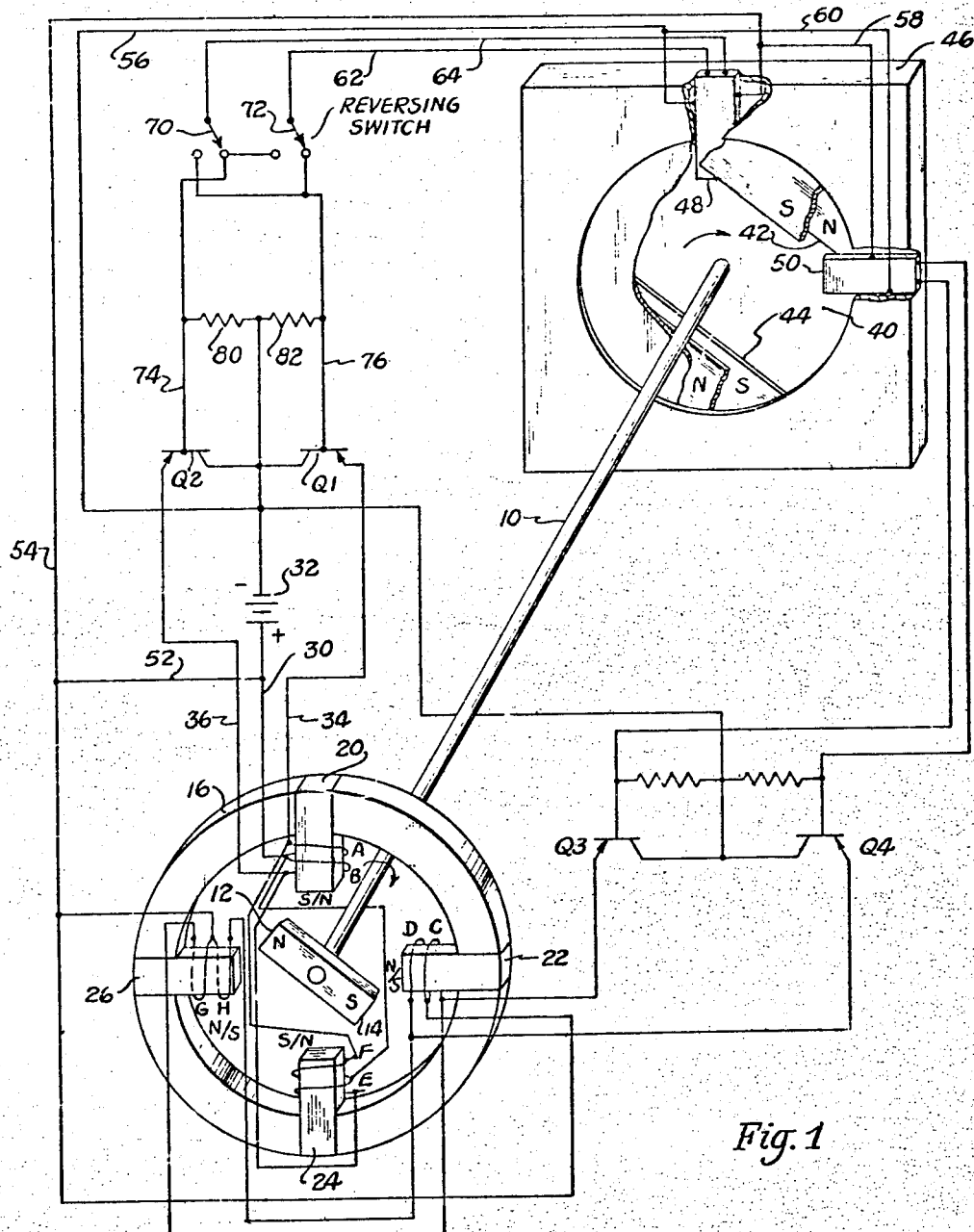

INVENTOR
Wesley O. Niccolls

Oct. 5, 1965 W. O. NICCOLLS 3,210,631
MAGNETIC ACTUATOR
Filed Oct. 5, 1961 2 Sheets-Sheet 2
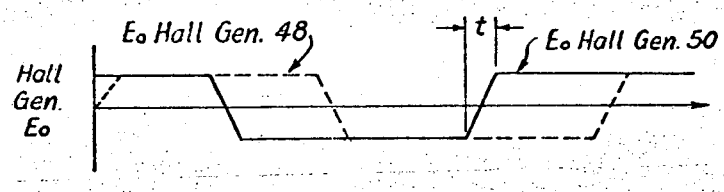
Fig. 2
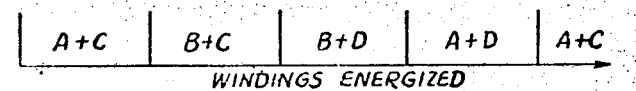
Fig. 2a
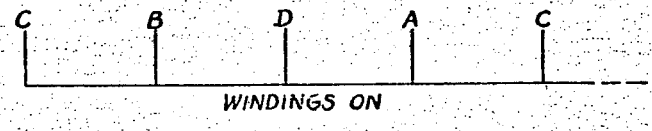
Fig. 2b
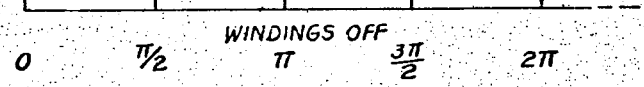
Fig. 2c
Fig. 2d
INVENTOR
Wesley O. Niccolls

3,210,631
MAGNETIC ACTUATOR
Wesley O. Niccolls, Washington, D.C., assignor to Nictronix, Inc., Wilmington, Del., a corporation of Delaware
Filed Oct. 5, 1961, Ser. No. 143,214
3 Claims. (Cl. 318—138)

This invention relates to a magnetic actuator, such as a magnetic motor or magnetic generator. In particular, the invention is disclosed, for example, as a self-commutating direct current magnetic motor. Self-commutating direct current motors have been proposed as disclosed, for example, in Thomas Patent No. 2,631,264 and in the Brailsford Patents Nos. 2,719,944, 2,753,350, and 2,769,- 976. However, such motors either lack the ability of controlled reversibility and of being self-starting, or necessitate the use of mechanical switches or slip rings in order to render them self-starting. The use of brushes or slip rings inherently makes the motors liable to arcing so that they cannot be used in places where arcing is undesirable. Moreover, these particular direct current motors lack the versatility of an alternating current motor.

The object of this invention is to produce a direct current magnetic motor which has the versatility of operation of either a direct current or an alternating current motor, has advantages derived from a combination of direct and alternating current motors, is self-starting, reversible, and has a gradient scale control.

In general, these and other objects of this invention are accomplished by constructing a motor having a rotor provided with at least one permanently magnetized north pole and a corresponding south pole. The stator poles are at least twice the number of the rotor poles, and each stator pole is wound so that its polarity can be reversed from N to S, or vice versa, depending upon the position of the rotor poles. A brushless resolver employing such as, for example, a Hall Effect Generator is controlled by the rotor shaft and connected to semiconductor switches to control the switching between the power supply and the stator windings. In operation, the stator winding nearest, for example. the N pole of the rotor is energized to be a S pole and thus attracts the N pole of the rotor. Then, as the N rotor pole passes the S stator pole, the polarity of the stator pole is changed from S to N so as to repel the N rotor pole and thus drive the motor. A reverse polarization action, of course, simultaneously occurs between the opposite S rotor pole and its corresponding stator pole. A similar pair of poles is positioned between these N and S poles so that they exert attracting forces on the rotor during the time the first mentioned poles are being switched in their polarity. The rotor poles rotate toward the intermediate stator poles, and when they are opposite, these stator poles switch polarity, while the aforementioned pair of poles then function as intermediate poles. Thus at any position of the N rotor pole, in the direction of its rotation, there are always two successive S stator poles in advance of the N rotor pole to attract it, and two successive N stator poles behind the N rotor pole to repel it. This effectively creates a rotating magnetic stator field to drive the motor. When this invention is in the form of a generator, the rotor is driven by a prime mover to produce an electromotive force in the stator windings.

The means by which the objects of the invention are obtained are disclosed more fully with reference to the accompanying drawings, in which:

FIGURE 1 is a schematic perspective view of the motor of this invention; and

FIGURES 2 to 2d, inclusive, are graphs illustrating the sequential reversals of the stator windings to control the polarity of each stator pole.

As shown in FIGURE 1, the rotor is composed of a shaft 10 carrying the permanently magnetized N pole 12 and the corresponding S pole 14. The stator is composed of a frame 16 of magnetic material in which are mounted the stator poles 20, 22, 24 and 26, respectively, composed of magnetic material. Each stator pole is similarly wound so that it will suffice to describe the winding for the stator pole 20 alone. Pole 20 has a winding divided by center tap into two subwindings A and B. Line 30 leading from the center tap extends to a source of direct current, such as battery 32. Line 34 joins the free end of subwinding A to a transistor Q1. Line 36 likewise joins subwinding B to a second transistor Q2. It is apparent that in this flip-flop circuit that when either transistor Q1 or Q2 is rendered conducting, its corresponding subwinding A or B will be energized, and that a changeover from the energizing of either subwinding A or B will change the direction of the current flowing through the stator winding, and thus a change in the polarity of pole 20 from N to S, or vice versa.

A sparkless switching means is used to render transistors Q1 and Q2 successively conducting. For example, a Hall Effect Generator, such as a Hall generator Type 803 produced by the Westinghouse Electric Company and described in its technical data sheet 54–961 dated December 1958, is actuated by the rotor shaft 10. Briefly, this resolver is composed of a rotor 40 mounted on shaft 10 and carrying diametrically opposed permanent magnets 42 and 44. Each magnet is split into two poles of N and S polarity, respectively, and the polarity of the diametrically opposed magnets is reversed. The resolver stator frame 46 supports Hall Effect Generators 48 and 50, respectively. Control current taken from battery 32 through line 52 joined to line 30 and line 54 passes through Hall generator 48 and returns to the battery via line 56. Similarly a control current is taken to generator 50 through line 58 joined to line 54, and returned to the battery through line 60 joined to line 56. When the pole 42 presents a N pole on one side face and a S pole on the opposite side face of generator 48, a positive voltage is generated in line 62 and a negative voltage in line 64 which are passed, respectively, to the terminals 70 and 72 of a motor reversing switch, the switch blades of which are selectively set manually or automatically for the forward or reverse rotation of the motor. Assuming that the switch is set for a clockwise rotation of the motor, the current passing through the terminals leads through lines 74 and 76, respectively, to transistors Q2 and Q1. Lines 74 and 76, respectively, are the signal lines to determine the conductive state of transistors Q2 and Q1, respectively. As rotor 40 rotates it produces a reciprocating signal voltage in generator 48 which is presented to the base resistors 80 and 82 joined between lines 74 and 76. The emitters of transistors Q1 and Q2 are connected to circuit ground, as is the common connection of base resistors 80 and 82.

When a positive voltage is applied to the transistor Q1 through line 76 across base resistor 82, transistor Q1 conducts. During this time, a negative voltage is applied to the base of transistor Q2 across the base transistor 80 and prevents the transistor Q2 from conducting. Conduction in transistor Q1 energizes subwinding A causing pole 20 to have a S polarity. When the change-over at the Hall generator 48 is from one magnet to the other, as from magnet 42 to magnet 44, the polarity is reversed across the base resistors 80 and 82 putting transistor Q2 in the conducting state and transistor Q1 in the non-conducting state and energizing subwinding B, while de-energizing subwinding A so that the pole is polarized as a N pole.

A gradient scale control of the torque on the motor rotor is obtained by shifting the angular position of the magnets 42 and 44 on shaft 10 with respect to the rotor poles 12 and 14. This, in effect, is accomplished by shifting the angular position of frame 46 holding Hall generators 48 and 50. When the timing point for switching pole 20 is set to occur at the instant when N rotor pole 12 is opposite stator pole 22, a state occurs in which pole 12 is being equally attracted and repelled by poles 20 and 22 when pole 12 is halfway between them. This constitutes a reduction of the average torque to zero without reducing the incremental torque, so that the motor is stopped. By controlling the conduction of Q1 or Q2 with respect to the angle of shaft 10, a stepping action in the energizing of the motor is obtained so that a reversible stepping action is possible in either a forwards or backwards direction.

If the motor is running and the switching time instant is advanced further toward pole 24, a larger counter-clockwise torque is produced on shaft 10 which increases as the switching point approaches pole 24. This constitutes controlled dynamic braking action. Then when the switching time instant is at pole 24, the maximum dynamic braking force is reached, the rotor will stop, and then, depending on inertia and load conditions, will run in the opposite direction. This incremental time of switching gives a gradient scale control of the average torque of the motor with increasing larger dynamic braking force as the switching point is moved from the mid-point position to pole 24.

As shown, the stator poles 22, 24 and 26 can be wired to the switching device in the same manner as disclosed for rotor pole 20.

The graphs of FIGURES 2 to 2d show how the successive windings are energized by the switching device. For example, in FIGURE 2, the Hall generator voltage Eo produced by pole 48 causes the transistor Q1 to conduct, and simultaneously Hall generator voltage Eo produced by pole 50 causes transistor Q3 to conduct, as seen in FIGURE 2a, and thus energizes subwindings A and C, as indicated by FIGURE 2b. In FIGURE 2c, it is shown that in the rotor position of $\pi/2$ radians, the subwinding B becomes energized, while, as shown in FIGURE 2d, the subwinding A is de-energized. Referring back to FIGURE 2a, it is shown that the various transistors for successive poles overlap in their conducting periods so that the stator field is always energized. It is thus also apparent that, while alternate windings are energized in a given direction, the intermediate alternate windings are simultaneously being switched in their direction of magnetization.

While this invention has been described with reference to a rotory motor, the principle of successively changing the polarity of stator poles is applicable to a linear motor.

The magnetic actuator of this invention functions as a generator when a load such as a resistor is substituted for battery 32. In a special case, the battery can be the load. A prime mover is then used to drive shaft 10. The directions of the current induced in the respective stator subwindings are determined by the polarity of the rotor pole which is moving past the stator pole. The output of one of the subwindings is selected by the respective transistor Q1 or Q2 rendered conductive by the setting of the reversing switch.

Having now described the means by which the objects of the invention are obtained,

I claim:

1. In combination with a D.C. electric motor having a movable member with at least one N-S pole positioned within the magnetic field of a stationary member having windings forming at least twice the number of N-S poles than in said movable member, a control circuit including a source of D.C. current joined to said windings on said stationary member, and brushless resolver means actuated by said movable member and connected to said windings on said stationary member for successively energizing alternate windings in a given direction while simultaneously switching the direction of energization of the intermediate alternate windings.

2. In the combination of claim 1, said reversal means including a Hall Effect Generator.

3. A system for actuating a D.C. electric motor having a movable member with at least one N-S poled member positioned within the magnetic field of a stationary member having at least twice the number of N-S poles than in said movable member, a D.C. source, position resolver controlled current reversal means driven by said movable member and joining said current source to the poles on said stationary member, and brushless means for varying the angular position of said reversal means with respect to said movable member to vary the timing of the reversal of said current to selectively magnetize all of said poles in said stationary member and produce variable motor characteristics such as variable speed and torque, dynamic braking, power generation and reversibility, and selectable modes of operation, including external synchronous action, anti-synchronous action, free-running action, stepper motor action, and self-starting.

References Cited by the Examiner

UNITED STATES PATENTS

| 2,512,325 | 6/50 | Hansen | 310—46 |
| 2,536,805 | 1/51 | Hansen | 310—10.1 |
| 2,719,944 | 10/53 | Brailsford | 318—138 X |
| 3,042,819 | 7/62 | Kennedy | 310—49 |
| 3,042,847 | 7/62 | Welch | 310—49 |
| 3,136,935 | 6/64 | Hogan | 318—138 |
| 3,153,185 | 10/64 | Hummel | 318—138 X |

ORIS L. RADER, *Primary Examiner.*

MILTON O. HIRSHFIELD, *Examiner.*